(12) United States Patent
Wimmers et al.

(10) Patent No.: US 11,209,556 B2
(45) Date of Patent: Dec. 28, 2021

(54) MULTILAYER PIXELATED SCINTILLATOR WITH ENLARGED FILL FACTOR

(71) Applicant: KONINKLIJKE PHILIPS N.V., Eindhoven (NL)

(72) Inventors: Onno Jan Wimmers, Valkenswaard (NL); Johannes Wilhelmus Maria Jacobs, Boxtel (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 16/770,974

(22) PCT Filed: Aug. 22, 2018

(86) PCT No.: PCT/EP2018/072636
§ 371 (c)(1),
(2) Date: Jun. 9, 2020

(87) PCT Pub. No.: WO2019/115024
PCT Pub. Date: Jun. 20, 2019

(65) Prior Publication Data
US 2021/0165114 A1 Jun. 3, 2021

(30) Foreign Application Priority Data
Dec. 11, 2017 (EP) .................... 17206392

(51) Int. Cl.
*G01T 1/20* (2006.01)
*G01T 1/166* (2006.01)

(52) U.S. Cl.
CPC .......... *G01T 1/2018* (2013.01); *G01T 1/1663* (2013.01)

(58) Field of Classification Search
CPC ... G01T 1/2018; G01T 1/1663; G01T 1/2006; G01T 1/2033; G01T 3/06; G01T 1/201;
(Continued)

(56) References Cited

U.S. PATENT DOCUMENTS

| 4,945,241 A | 7/1990 | Yamashita |
| 5,208,460 A | 5/1993 | Rougeot |

(Continued)

FOREIGN PATENT DOCUMENTS

| EP | 1132754 A2 | 9/2001 |
| JP | 2016173267 A | 9/2016 |
| WO | WO2019115414 A1 | 6/2019 |

OTHER PUBLICATIONS

Translation of JP2016173267A (Year: 2016).*
(Continued)

*Primary Examiner* — David P Porta
*Assistant Examiner* — Mamadou Faye
(74) *Attorney, Agent, or Firm* — Larry Liberchuk (57) ABSTRACT

A radiation detector with first and second scintillator structures is disclosed. The first scintillator structure comprises a plurality of first scintillator pixels. The first scintillator pixels are separated by gaps, which may be filled with a reflective material to achieve an optical separation of the first scintillator pixels. The second scintillator structure is adapted to increase the absorption of radiation and the output of light. Thereto, the second scintillator structure overlaps at least partially the gaps between first scintillator pixels. The second scintillator structure is optically coupled to the first scintillator structure, so that light emitted by the second scintillator structure is fed into first scintillator pixels. The second scintillator structure may be mounted onto the first scintillator structure using additive manufacturing.

17 Claims, 4 Drawing Sheets

(58) Field of Classification Search
CPC ............... G01T 1/2002; G01T 1/20183; G01T 1/20185; G01T 1/20; G01T 1/2023; G01T 5/02; G01T 1/2985; G01T 3/08; G01T 1/202; G01N 23/046; H01L 27/14663
See application file for complete search history.

(56) References Cited

U.S. PATENT DOCUMENTS

| | | |
|---|---|---|
| 7,772,558 B1 | 8/2010 | Nagarkar |
| 9,650,569 B1* | 5/2017 | Cohen ..................... G21K 4/00 |
| 2004/0004190 A1 | 1/2004 | Brahme |
| 2005/0129171 A1 | 6/2005 | Jiang |
| 2007/0098138 A1 | 5/2007 | Bessho |
| 2008/0304618 A1 | 12/2008 | Hoffman |
| 2015/0171134 A1* | 6/2015 | Couture ............ H01L 27/14636 250/366 |
| 2017/0322320 A1 | 11/2017 | Jacobs |
| 2018/0136340 A1* | 5/2018 | Nelson ................. A61B 6/4241 |

OTHER PUBLICATIONS

PCT International Search Report, International application No. PCT/EP2018/072636 dated Nov. 28, 2018.

Cha B.K. et al., "Improvement of the Sensitivity and Spatial Resolution of Pixelated CsI:TI Scintillator with Reflective Coating", Nuclear Instruments and Methods in Physics Research A, Mar. 25, 2009, p. 145-149.

Lee C.H. et al., "Monte Carlo study on Optimization of Reflectors in Pixelated CsI Film for Mammographic Application", Journal of Nuclear Science and Technology, Supplement 5, p. 485-488 (Jun. 2008).

* cited by examiner

MULTILAYER PIXELATED SCINTILLATOR WITH ENLARGED FILL FACTOR

FIELD OF THE INVENTION

The invention relates to a radiation detector, an imaging system comprising a radiation detector and a method for manufacturing a radiation detector. The radiation detector according to the invention comprises first and second scintillator structures, wherein the second scintillator structure overlaps gaps between scintillator pixels of the first scintillator structure.

BACKGROUND OF THE INVENTION

A number of imaging systems such as medical X-ray imaging systems, imaging systems for security applications as well as imaging systems for nondestructive testing utilize radiation detectors with a scintillator structure, wherein the scintillator structure comprises a plurality of scintillator pixels. The scintillator pixels are small blocks of scintillator material, which are separated by gaps. The scintillator pixels absorb radiation and emit at least part of the absorbed energy in the form of light. The radiation may for example be X-rays or gamma rays. The emitted light may be detected by a read-out sensor array comprising a plurality of light-sensitive sensor pixels. The light-sensitive sensor pixels may for example be photodiodes. The gaps between the scintillator pixels may be filled with reflective material to prevent the propagation of light between adjacent scintillator pixels. Hence, the reflector material inside the gaps between scintillator pixels reduces the spread of light and increases the spatial resolution of the radiation detector.

The required width of the gaps between scintillator pixels depends on the type of reflector material inside the gaps. If the gaps between scintillator pixels are filled with air, the optical separation is achieved by the difference in refractive index between scintillator material and air. In this case, the gaps between scintillator pixels can be small, but the optical separation between scintillator pixels is poor. An improved optical separation can be achieved by means of thin-film reflectors made of for example silver or aluminium. In this case, the gaps between scintillator pixels can be small, but thin-film reflectors do not provide full (100%) reflectivity. Furthermore, a chemical reaction of the thin-film reflector material with the scintillator material may deteriorate the reflective properties. The gaps between scintillator pixels can alternatively be filled with reflective particle-in-binder materials, which may comprise for example $TiO_2$ or $SiO_2$ particles. Such reflective particle-in-binder materials are advantageous as they can provide almost full (100%) reflectivity if the width of the gaps between scintillator pixels is above 0.05 mm, preferably 0.1 mm.

The light-sensitive sensor pixels of the read-out sensor array may have sizes of 0.05 to 2 mm parallel to the surface of the read-out sensor array. The scintillator pixels of the scintillator structure preferably have similar sizes parallel to the surface of the scintillator structure to obtain a high spatial resolution capability. For small scintillator pixels, the area of the gaps between the scintillator pixels becomes a significant fraction of the total area of the scintillator structure. In other words, for a fixed width of the gaps between scintillator pixels, smaller scintillator pixel sizes result in a reduced scintillator fill factor. This causes a reduction of the absorption of radiation, and correspondingly, a reduction of the light output. Herein, the scintillator fill factor is defined as the fraction of the area of the scintillator structure that is covered by scintillator material. Thus, the scintillator fill factor is the fraction of the area of the scintillator structure that is sensitive to radiation.

SUMMARY OF THE INVENTION

Hence, there may be a need to provide a scintillator based radiation detector with high spatial resolution capability and high scintillator fill factor. The high scintillator fill factor corresponds to a high absorption of the radiation that impinges on the radiation detector, which results in a high output of light.

The problem of the present invention is solved by the subject matter of the independent claims, wherein further embodiments are incorporated in the dependent claims. It should be noted that the aspects of the invention described in the following apply similarly to the radiation detector, the imaging system comprising a radiation detector and the method for manufacturing a radiation detector.

According to the present invention, a radiation detector is presented. The radiation detector comprises a read-out sensor array, a first scintillator structure, a second scintillator structure and a coating. The read-out sensor array comprises a plurality of light-sensitive sensor pixels. The first scintillator structure comprises a plurality of first scintillator pixels separated by gaps. The first scintillator structure and the second scintillator structure are optically coupled and arranged between the coating and the read-out sensor array. The second scintillator structure at least partially overlaps the gaps between the first scintillator pixels of the first scintillator structure. The second scintillator structure comprises a plurality of second scintillator pixels separated by gaps, and at least one second scintillator pixel at least partially overlaps a gap between the first scintillator pixels.

The radiation detector may be utilized within an imaging system such as, for example, a medical X-ray imaging system, an imaging system for nondestructive testing or an imaging system for security applications. The first scintillator structure comprises a plurality of first scintillator pixels. The first scintillator pixels are blocks of scintillator material, which are separated by gaps. The gaps between the first scintillator pixels are preferably connected with each other so that these gaps form a connected grid. The first scintillator pixels may be arranged in a planar layer. Furthermore, the first scintillator pixels may be arranged on a regular two-dimensional grid. For example, the first scintillator pixels may form a uniform rectangular or hexagonal array. The first scintillator pixels may also be arranged in a non-planar layer. The first scintillator pixels may be sensitive for example to X-rays or gamma rays. Hence, the first scintillator pixels may be configured to absorb radiation such as X-rays or gamma rays and to emit at least part of the absorbed energy in the form of light.

The gaps between the first scintillator pixels optically separate these pixels, at least partially. Thereto, the gaps between the first scintillator pixels may comprise a light reflecting material. Hence, the gaps between the first scintillator pixels are configured to prevent that light emitted by one of the first scintillator pixels propagates to an adjacent first scintillator pixel.

The emitted light may be detected by the light-sensitive sensor pixels of the read-out sensor array. The light-sensitive sensor pixels may be realized by means of photodiodes. The light-sensitive sensor pixels may be arranged in a planar layer, and this planar layer may be arranged parallel to a planar layer of first scintillator pixels. The light-sensitive sensor pixels may form a uniform rectangular array, but other array geometries are also possible. For example, the light-sensitive sensor pixels may alternatively form a uniform hexagonal array. It is also possible that the light-sensitive sensor pixels are arranged in a nonplanar layer. For example, the first scintillator pixels and the light-sensitive sensor pixels may be arranged in concentric nonplanar layers. The geometry of the light-sensitive sensor pixels may be identical or similar to the geometry of the first scintillator pixels. Alternatively, the geometry of the light-sensitive sensor pixels may be different from the geometry of the first scintillator pixels.

The width of the gaps between the first scintillator pixels is preferably sufficient to provide a good optical separation between the first scintillator pixels, wherein the width of the gaps between the first scintillator pixels is the distance between adjacent first scintillator pixels. Hence, the width of the gaps is measured parallel to the surface of the layer, in which the first scintillator pixels are arranged. The gaps between the first scintillator pixels may be filled, for example, with a reflective particle-in-binder material, which may comprise $TiO_2$ or $SiO_2$ particles. Such reflective particle-in-binder materials can provide almost total optical separation between first scintillator pixels if the width of the gaps between the pixels is above 0.5 mm, preferably above 1 mm.

To achieve a good spatial resolution capability, the first scintillator pixels should have small sizes parallel to the surface of the layer, in which the first scintillator pixels are arranged. For example, the first scintillator pixels may have sizes of 0.2 to 0.5 mm. Note that the present invention shall not be limited by such measures for the size of the first scintillator pixels or the width of the gaps between first scintillator pixels.

The gaps between the first scintillator pixels are not sensitive to radiation. Assuming a fixed width of the gaps between the first scintillator pixels, reducing the size of the first scintillator pixels leads to a reduction of the fill factor of the first scintillator structure, i.e., the first scintillator structure absorbs a smaller fraction of the radiation that impinges onto the radiation detector. To achieve a higher scintillator fill factor, a second scintillator structure is provided. Note that, in this case, the scintillator fill factor refers to the fill factor of the combination of first and second scintillator structures.

The second scintillator structure at least partially overlaps the gaps between the first scintillator pixels. The second scintillator structure is optically coupled to the first scintillator structure, so that light emitted by the second scintillator structure can propagate to a first scintillator pixel. The second scintillator structure is introduced to detect radiation, which may otherwise fall onto a gap between the first scintillator pixels. The second scintillator structure therefore leads to an increased absorption of radiation and an increased output of light. At the same time, the second scintillator structure may result in image distortions, because radiation that would fall onto a gap between first scintillator pixels does not necessarily lead to the detection of light by the light-sensitive sensor pixel closest to the gap. Instead, the second scintillator structure converts this radiation into light and feeds the light into a first scintillator pixel adjacent to the gap. Thus, the light may be detected by a light-sensitive sensor pixel that is further away from the light-sensitive sensor pixel closest to the gap between the first scintillator pixels. Depending on whether the light is fed evenly or unevenly into the first scintillator pixels adjacent to the gap, the image distortions may be unbiased or biased, respectively. For example, the light may be fed always into one first scintillator pixel adjacent to the gap, resulting in biased image distortions. Alternatively, the light may be fed with equal probabilities into the first scintillator pixels adjacent to the gap, resulting in unbiased image distortions.

The first and second scintillator pixels may be made of different materials. For example, the first scintillator pixels may be made of a ceramic scintillator material, whereas the second scintillator pixels may be made of a particle-in-binder scintillator material. Such a particle-in-binder scintillator material may be mounted onto the first scintillator structure by means of additive manufacturing.

The coating may be a light-reflective coating or a light-absorbing coating. The scintillator materials of the first or second scintillator structures absorb radiation and emit light in arbitrary directions. A reflective coating may be adapted to reflect light, which may have been emitted by the scintillator material in a direction away from the read-out sensor array, back towards the read-out sensor array, so that it can be detected. In contrast, an absorbing coating may be adapted to absorb light, which may have been emitted by the scintillator material in a direction away from the read-out sensor array, so that it cannot propagate to distant light-sensitive sensor pixels.

The first and second scintillator structures are arranged between the coating and the read-out sensor array. More specifically, the read-out sensor array, the first scintillator structure, the second scintillator structure and the coating may be arranged in this order. Alternatively, the ordering may be read-out sensor array, second scintillator structure, first scintillator structure and coating. These two arrangements of the radiation detector components will be described in further detail below.

The second scintillator structure comprises a plurality of second scintillator pixels separated by gaps. The gaps between the second scintillator pixels of the second scintillator structure are preferably connected so that they form a connected grid. The gaps between the second scintillator pixels may optically separate the second scintillator pixels, so that light emitted by one of the second scintillator pixels cannot propagate into adjacent second scintillator pixels. Thereto, the gaps between the second scintillator pixels may be filled at least partially with an optical reflector material. The gaps between the first and second scintillator pixels may be filled with the same optical reflector material. Alternatively, the gaps between the first and second scintillator pixels may be filled with different optical reflector materials.

At least one second scintillator pixel at least partially overlaps a gap between the first scintillator pixels. The at least one second scintillator pixel is configured, upon being irradiated, to feed light into a first scintillator pixel. Thereto, the at least one second scintillator pixel is optically coupled to a first scintillator pixel. The at least one second scintillator pixel at least partially overlaps a gap between the first scintillator pixels to provide an increase of the scintillator fill factor. In an exemplary embodiment, the gaps between the first scintillator pixels may be filled with air. Then, the optical separation of first scintillator pixels is achieved by the difference in refractive index between air and the material of the first scintillator pixel. In this case, the gaps between scintillator pixels can be small, but the optical separation between the first scintillator pixels is poor.

In another exemplary embodiment, the gaps between the first scintillator pixels of the first scintillator structure are at least partially filled with an optical reflector material. For example, the gaps between the first scintillator pixels may be filled with a thin-film reflector made of for example silver or aluminium. In this case, the gaps between the first scintillator pixels can be narrow, but thin-film reflectors may provide only a partial reflection of light. Furthermore, a chemical reaction of the thin-film reflector material with the scintillator material may deteriorate the reflective properties.

Alternatively, the gaps between scintillator pixels may be filled with reflective particle-in-binder materials, which may comprise for example $TiO_2$ or $SiO_2$ particles. Such reflective particle-in-binder materials are advantageous as they can provide almost total optical separation if the width of the gaps between scintillator pixels is above 0.05 mm, preferably above 0.1 mm.

In another exemplary embodiment, the first scintillator structure comprises ceramic scintillator material, and the second scintillator structure comprises particle-in-binder scintillator material. A radiation detector with ceramic scintillator material in the first scintillator structure and particle-in-binder scintillator material in the second scintillator structure may be manufactured by mounting the second scintillator structure onto the first scintillator structure by means of additive manufacturing.

In another exemplary embodiment, the first scintillator structure and the second scintillator structure may both comprise ceramic scintillator material. In another exemplary embodiment, the first scintillator structure and the second scintillator structure may both comprise particle-in-binder scintillator material. In another exemplary embodiment, the first scintillator structure may comprise particle-in-binder scintillator material and the second scintillator structure may comprise ceramic scintillator material.

In another exemplary embodiment, the coating is a light-reflective layer. As noted above, the scintillator materials of the first and second scintillator structures absorb radiation and emit at least part of the absorbed energy in the form of light. Thereby, the light is emitted in arbitrary directions. The light-reflective coating is preferably adapted to reflect light, which may have been emitted by scintillator material in a direction away from the read-out sensor array, back towards the read-out sensor array, so that it can be detected.

In another exemplary embodiment, the coating is a light-absorbing layer. The light-absorbing coating is preferably adapted to absorb light, which may have been emitted by scintillator material in a direction away from the read-out sensor array, so that this light cannot propagate to distant light-sensitive sensor pixels.

In another exemplary embodiment, the read-out sensor array, the first scintillator structure, the second scintillator structure and the coating are arranged in this order. A radiation detector according to this embodiment may preferably be arranged so that the radiation first falls onto the coating. The radiation may propagate through the coating and may be absorbed by scintillator material of the first and second scintillator structures. The scintillator material of the first and second scintillator structures may emit light, which may be detected by the light-sensitive sensor pixels of the read-out sensor array. In an imaging system comprising a radiation source and a radiation detector according to this embodiment, the read-out sensor array of the radiation detector is preferably directed towards the radiation source.

In another exemplary embodiment, the read-out sensor array, the second scintillator structure, the first scintillator structure and the coating are arranged in this order. A radiation detector according to this embodiment may preferably be arranged so that the radiation first falls onto the read-out sensor array. The radiation may propagate through the read-out sensor array and may be absorbed by scintillator material of the first and second scintillator structures. The scintillator material of the first and second scintillator structures may emit light, which may be detected by the read-out sensor array. In an imaging system comprising a radiation source and a radiation detector according to this embodiment, the read-out sensor array is preferably directed away from the radiation source.

In another exemplary embodiment, at least one second scintillator pixel at least partially overlaps a gap between the first scintillator pixels, and the at least one second scintillator pixel is configured, upon being irradiated, to feed light into exactly one first scintillator pixel. Thereto, the at least one second scintillator pixel is optically coupled to the exactly one first scintillator pixel. The at least one second scintillator pixel at least partially overlaps at least one of the gaps between the first scintillator pixels to provide an increase of the scintillator fill factor. To prevent that light emitted by the at least one second scintillator pixel propagates anywhere else than to the exactly one optically coupled first scintillator pixel, the at least one second scintillator pixel may be surrounded by light reflective material except for the optical coupling to the exactly one first scintillator pixel. In particular, the light-reflective surrounding of the at least one second scintillator pixel prevents that light emitted by this pixel propagates to other second scintillator pixels and to more than one first scintillator pixel. To improve the optical separation of the at least one second scintillator pixel from first scintillator pixels other than the exactly one optically coupled first scintillator pixel, the at least one second scintillator pixel may be tilted. The tilting may be configured such that it results in a larger gap to adjacent first scintillator pixels other than the exactly one optically coupled first scintillator pixel. The optical coupling of the at least one second scintillator pixel to exactly one first scintillator pixel may provide a high spatial resolution capability, but it may also lead to a biased optical transfer function.

In another exemplary embodiment, at least one second scintillator pixel at least partially overlaps a gap between the first scintillator pixels and the at least one second scintillator pixel is tilted relative to the layer formed by the first scintillator structure to increase a gap between the at least one second scintillator pixel and a first scintillator pixel, which is not optically coupled to the at least one second scintillator pixel. In other words, the at least one second scintillator pixel is tilted to improve the optical separation of the at least one second scintillator pixel from first scintillator pixels, which are not optically coupled to the at least one second scintillator pixel. The tilting may be configured such that it results in a larger gap to adjacent first scintillator pixels, which are not optically coupled to the at least one second scintillator pixel. The at least one second scintillator pixel may be optically coupled to one first scintillator pixel. Alternatively, the at least one second scintillator pixel may be optically coupled to two or more first scintillator pixels, for example to two or more first scintillator pixels arranged according to a uniform linear array. In another exemplary embodiment, at least one second scintillator pixel at least partially overlaps a gap between the first scintillator pixels, and the at least one second scintillator pixel is configured, upon being irradiated, to feed light into more than one first scintillator pixel. Thereto, the at least one second scintillator pixel may be optically coupled to more than one first scintillator pixels. The at least one second scintillator pixel at least partially overlaps at least one of the gaps between the first scintillator pixels to provide an increase of the scintillator fill factor. Optically coupling the at least one second scintillator pixel to more than one first scintillator pixel may be preferable from a manufacturing point of view. Furthermore, this may provide an unbiased optical transfer function.

At the same time, optically coupling the at least one second scintillator pixel to more than one first scintillator pixels may result in a worse spatial resolution capability as compared to optically coupling the at least one second scintillator pixel to exactly one first scintillator pixel.

In another exemplary embodiment, at least one second scintillator pixel at least partially overlaps a gap between the first scintillator pixels, and the at least one second scintillator pixel is optically coupled to exactly two first scintillator pixels. Hence, the at least one second scintillator pixel is configured, upon being irradiated, to feed light into exactly two first scintillator pixels. The at least one second scintillator pixel at least partially overlaps a gap between the first scintillator pixels to provide an increase of the scintillator fill factor. Optically coupling the at least one second scintillator pixel to two scintillator pixels may be preferable from a manufacturing point of view. Furthermore, this may provide an unbiased optical transfer function.

In an exemplary embodiment, the at least one second scintillator pixel does not extend into the gap between the exactly two first scintillator pixels, which are optically coupled to the at least one second scintillator pixel. To couple to the exactly two first scintillator pixels, the at least one second scintillator pixel overlaps these first scintillator pixels. For example, the at least one second scintillator pixel may be separated from the exactly two first scintillator pixels via a plane. In this example, a wave vector of light emitted by the at least one second scintillator pixel needs to have a component orthogonal to the plane in order to propagate from the at least one second scintillator pixel towards an optically coupled first scintillator pixel. Propagating further in this direction orthogonal to the plane between the at least one second scintillator pixel and the exactly two first scintillator pixels may result in the light impinging on the read-out sensor array, where it is detected. Consequently, the probability may be low that light emitted by the at least one second scintillator pixel propagates to other second scintillator pixels via a first scintillator pixel, which is optically coupled to the at least one second scintillator pixel. This results in a high resolution capability of the radiation detector.

In an exemplary embodiment, the at least one second scintillator pixel comprises a slanted surface section, which is inclined relative to a layer formed by the first scintillator structure to reflect light from inside the at least one second scintillator pixel towards a first scintillator pixel, which is optically coupled to the at least one second scintillator pixel. Hence, the slanted surface section of the at least one second scintillator pixel is configured to guide light emitted by the at least one second scintillator pixel towards an optically coupled first scintillator pixel. The slanted surface section of the at least one second scintillator pixel may be planar, and the slanted surface section may touch the surface the first scintillator pixel, which is optically coupled to the at least one second scintillator pixel. The angle between the slanted surface section of the at least one second scintillator pixel and the surface of the optically coupled first scintillator pixel, when seen from inside the at least one second scintillator pixel, is less than 90° and may typically lie in a range from 30° to 60°. The at least one second scintillator pixel may comprise more than one slanted surface sections, which are inclined relative to a layer formed by the first scintillator structure to reflect light from inside the at least one second scintillator pixel towards one or more first scintillator pixels, which are optically coupled to the at least one second scintillator pixel.

In another exemplary embodiment, the radiation detector further comprises a substrate, which is made of thin flexible polymer foil or glass.

In another exemplary embodiment, the radiation detector has a planar shape.

In another exemplary embodiment, the radiation detector has a non-planar shape. A radiation detector with a non-planar shape may be utilized for example in a computed tomography (CT) system.

According to the present invention, also an imaging system is presented, which comprises a radiation detector according to the invention. In particular, the imaging system may be a medical X-ray imaging system, an imaging system for security applications or an imaging system for nondestructive testing.

In an exemplary embodiment, the imaging system further comprises a radiation source and the read-out sensor array of the radiation detector is directed towards the radiation source. In this embodiment, the read-out sensor array, the first scintillator structure, the second scintillator structure and the coating of the radiation detector may be arranged in this order. Furthermore, the radiation detector may be arranged so that the radiation from the radiation source first falls onto the coating. The radiation may propagate through the coating and may be absorbed by scintillator material of the first and second scintillator structures. The scintillator material of the first and second scintillator structures may emit light, which may be detected by the light-sensitive sensor pixels of the read-out sensor array.

In another exemplary embodiment, the read-out sensor array of the radiation detector is directed away from the radiation source. In this embodiment, the read-out sensor array, the second scintillator structure, the first scintillator structure and the coating may be arranged in this order. Furthermore, the radiation detector may be arranged so that the radiation from the radiation source first falls onto the read-out sensor array. The radiation may propagate through the read-out sensor array and may be absorbed by scintillator material of the second and first scintillator structures. The scintillator material of the second and first scintillator structures may emit light, which may be detected by the read-out sensor array.

According to the present invention, also a method for manufacturing a radiation detector is presented. The method comprises assembling a read-out sensor array, a first scintillator structure, a second scintillator structure and a coating, wherein the read-out sensor array comprises a plurality of light-sensitive sensor pixels, the first scintillator structure comprises a plurality of first scintillator pixels separated by gaps, the second scintillator structure is optically coupled to the first scintillator structure, the first scintillator structure and the second scintillator structure are arranged between the coating and the read-out sensor array, the second scintillator structure at least partially overlaps the gaps between the first scintillator pixels of the first scintillator structure, the second scintillator structure comprises a plurality of second scintillator pixels separated by gaps, and at least one second scintillator pixel at least partially overlaps a gap between the first scintillator pixels.

In an exemplary embodiment, the method for manufacturing a radiation detector comprises mounting the second scintillator structure on the first scintillator structure by means of additive manufacturing, wherein the second scintillator structure comprises particle-in-binder scintillator material.

It shall be understood that the radiation detector, the imaging system and the method for manufacturing a radiation detector according to the invention have similar and/or identical preferred embodiments, in particular, as defined in the dependent claims.

These and other aspects of the present invention will become apparent from the embodiments described hereinafter.

BRIEF DESCRIPTION OF THE DRAWINGS

Exemplary embodiments of the invention will be described in the following with reference to the accompanying drawings.

DETAILED DESCRIPTION OF EMBODIMENTS

Figure 1:
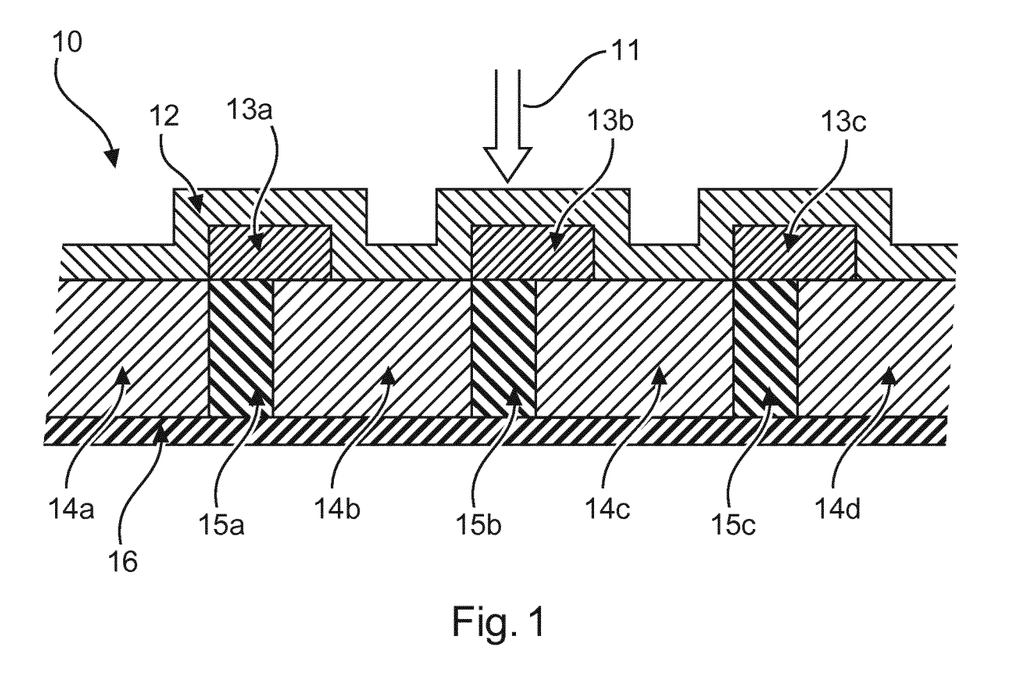
FIG. 1 shows schematically and exemplarily an embodiment of a radiation detector according to the present invention.

FIG. 1 shows schematically and exemplarily an embodiment of a radiation detector 10 according to the invention. More specifically, FIG. 1 shows a section of a radiation detector comprising a small number of scintillator pixels. The skilled person understands that radiation detectors with large numbers of scintillator pixels may be obtained by continuing the structure depicted in FIG. 1.

The radiation detector 10 comprises a read-out sensor array 16, a first scintillator structure, a second scintillator structure and a coating 12. The first scintillator structure of the radiation detector 10 comprises a plurality of first scintillator pixels 14a, 14b, 14c and 14d, which are separated by gaps 15a, 15b and 15c. The first scintillator pixels 14a, 14b, 14c and 14d may comprise ceramic scintillator material or particle-in-binder scintillator material. The gaps 15a, 15b and 15c between the first scintillator pixels may be filled at least partially with a reflective material so that light cannot propagate between first scintillator pixels.

The second scintillator structure of the radiation detector 10 comprises second scintillator pixels 13a, 13b and 13c. The second scintillator pixels 13a, 13b and 13c are optically coupled to the first scintillator pixels 14b, 14c and 14d, respectively. Hence, light can propagate between first and second scintillator pixels. The second scintillator pixels 13a, 13b and 13c overlap the gaps 15a, 15b and 15c between first scintillator pixels, respectively. Thus, the second scintillator pixels 13a, 13b and 13c absorb radiation, which may otherwise fall onto a gap 15a, 15b and 15c, respectively. The gaps between the first scintillator pixels are insensitive to radiation. Hence, the second scintillator pixels lead to an increased absorption of radiation, which corresponds to an increased scintillator fill factor.

The second scintillator pixels may comprise ceramic scintillator material or particle-in-binder scintillator material. In particular, the second scintillator pixels may comprise a different scintillator material than the first scintillator pixels. For example, the first scintillator pixels may comprise a ceramic scintillator material, and the second scintillator pixels may be mounted onto the first scintillator structure by means of additive manufacturing using particle-in-binder scintillator material.

Also shown is the direction 11 from where radiation impinges on the radiation detector 10. The radiation first propagates through the coating 12. Then, the radiation may be converted to light in the first scintillator pixels 14a, 14b, 14c or 14d or the second scintillator pixels 13a, 13b or 13c. The light emitted by scintillator material may be detected by the read-out sensor array 16, which comprises a plurality of light-sensitive sensor pixels.

Scintillator materials typically emit light in arbitrary directions. The coating 12 may be a light-reflective coating or a light-absorbing coating. A reflective coating 12 may be adapted to reflect light, which may have been emitted by the scintillator material in a direction away from the read-out sensor array 16, back towards the read-out sensor array 16, so that it can be detected. In contrast, an absorbing coating 12 may be adapted to absorb light, which may have been emitted by the scintillator material in a direction away from the read-out sensor array 16, so that it cannot propagate to distant light-sensitive sensor pixels.

The second scintillator structure of FIG. 1 may result in a biased optical transfer function. For example, radiation that would fall onto the gap 15a between first scintillator pixels 14a and 14b does not necessarily lead to the detection of light by the light-sensitive sensor pixel closest to the gap 15a. Instead, the second scintillator pixel 13a may absorb the radiation and emit light into the first scintillator pixel 14b. Thus, the light may be detected by a light-sensitive sensor pixel that is further away from the light-sensitive sensor pixel closest to the gap 15a between the first scintillator pixels 14a and 14b.

Figure 2:
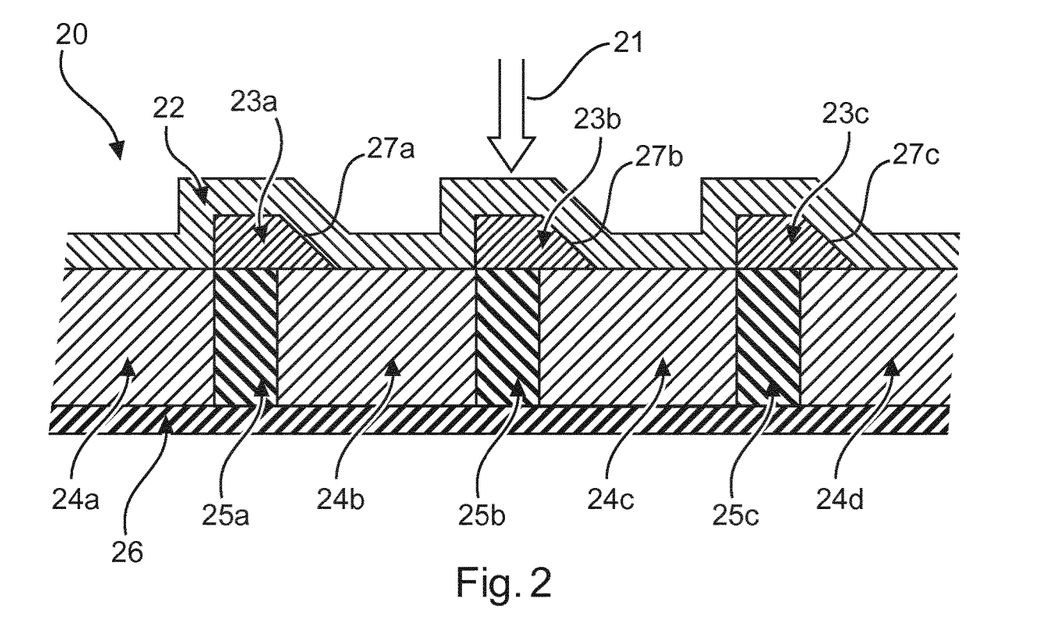
FIG. 2 shows schematically and exemplarily another embodiment of a radiation detector according to the present invention.

FIG. 2 shows schematically and exemplarily another embodiment of a radiation detector 20 according to the invention. More specifically, FIG. 2 shows a section of a radiation detector comprising a small number of scintillator pixels. The skilled person understands that radiation detectors with large numbers of scintillator pixels may be obtained by continuing the structure depicted in FIG. 2.

The radiation detector 20 has a number of similarities to the radiation detector 10 depicted in FIG. 1. In particular, the radiation detector 20 comprises a read-out sensor array 26, a first scintillator structure, a second scintillator structure and a coating 22. The first scintillator structure of the radiation detector 20 comprises a plurality of first scintillator pixels 24a, 24b, 24c and 24d, which are separated by gaps 25a, 25b and 25c. The first scintillator pixels 24a, 24b, 24c and 24d may comprise ceramic scintillator material or particle-in-binder scintillator material. The gaps 25a, 25b and 25c between the first scintillator pixels may be filled at least partially with a reflective material so that light cannot propagate between first scintillator pixels.

The second scintillator structure of the radiation detector 20 comprises second scintillator pixels 23a, 23b and 23c. The second scintillator pixels 23a, 23b and 23c are optically coupled to the first scintillator pixels 24b, 24c and 24d, respectively, so that light can propagate between these first and second scintillator pixels. The second scintillator pixels 23a, 23b and 23c overlap the gaps 25a, 25b and 25c between first scintillator pixels, respectively. Thus, the second scintillator pixels 23a, 23b and 23c result in an increased scintillator fill factor.

Also shown is the direction 21 from where radiation impinges on the radiation detector 20. The radiation first propagates through the coating 22. Then, the radiation may be converted to light in the first scintillator pixels 24a, 24b, 24c or 24d or the second scintillator pixels 23a, 23b or 23c. The light emitted by scintillator material of the first or second scintillator structures may be detected by the read-out sensor array 26, which comprises a plurality of light-sensitive sensor pixels.

The surfaces of the second scintillator pixels 23a, 23b and 23c comprise slanted surface sections 27a, 27b and 27c, respectively, which are inclined relative to the layer formed by the first scintillator structure. The slanted surface sections 27a, 27b and 27 are inclined to increase the probability that rays of light are reflected towards the first scintillator pixels. The angle between the slanted surface sections 27a, 27b and 27c and the layer formed by the first scintillator structure may typically lie in the range from 30° to 60°, but other angles are possible as well.

Figure 3:
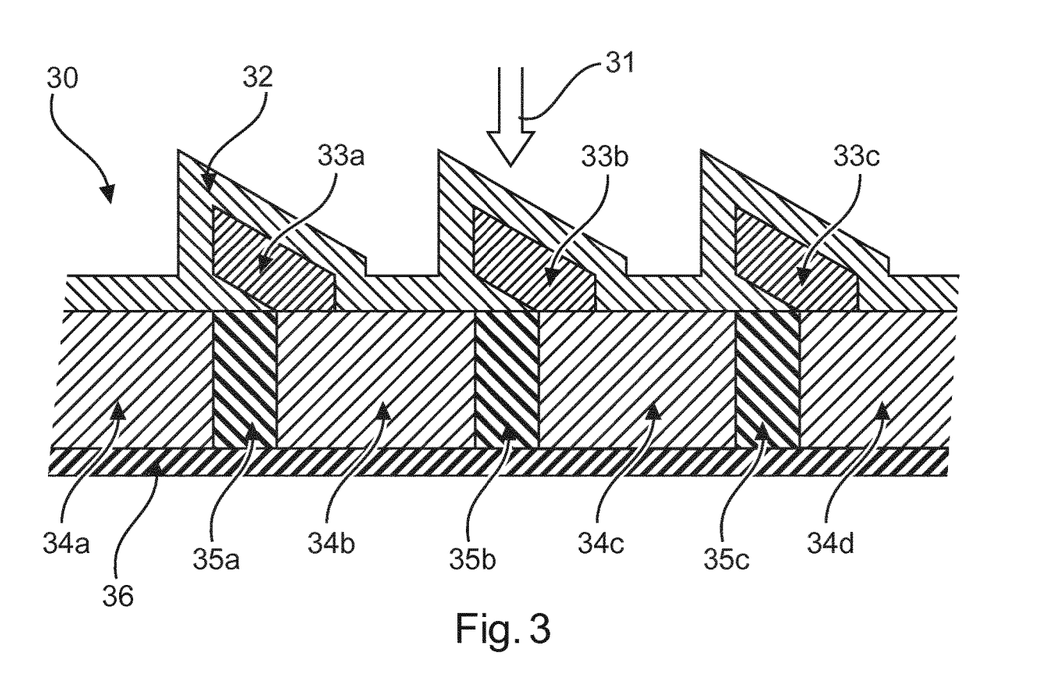
FIG. 3 shows schematically and exemplarily another embodiment of a radiation detector according to the present invention.

FIG. 3 shows schematically and exemplarily another embodiment of a radiation detector 30 according to the invention. More specifically, FIG. 3 shows a section of a radiation detector comprising a small number of scintillator pixels. The skilled person understands that radiation detectors with large numbers of scintillator pixels may be obtained by continuing the structure depicted in FIG. 3.

The radiation detector 30 has a number of similarities to the radiation detector 10 depicted in FIG. 1. In particular, the radiation detector 30 comprises a read-out sensor array 36, a first scintillator structure, a second scintillator structure and a coating 32. The first scintillator structure of the radiation detector 30 comprises a plurality of first scintillator pixels 34a, 34b, 34c and 34d, which are separated by gaps 35a, 35b and 35c. The first scintillator pixels 34a, 34b, 34c and 34d may comprise ceramic scintillator material or particle-in-binder scintillator material. The gaps 35a, 35b and 35c between the first scintillator pixels may be filled at least partially with a reflective material so that light cannot propagate between first scintillator pixels.

The second scintillator structure of the radiation detector 30 comprises second scintillator pixels 33a, 33b and 33c. The second scintillator pixels 33a, 33b and 33c are optically coupled to the first scintillator pixels 34b, 34c and 34d, respectively, so that light can propagate between first and second scintillator pixels. The second scintillator pixels 33a, 33b and 33c overlap the gaps 35a, 35b and 35c between first scintillator pixels, respectively. Thus, the second scintillator pixels 33a, 33b and 33c result in an increased scintillator fill factor.

Also shown is the direction 31 from where radiation impinges on the radiation detector 30. The radiation first propagates through the coating 32. Then, the radiation may be converted to light in the first scintillator pixels or the second scintillator pixels. The light emitted by the scintillator pixels may be detected by the read-out sensor array 36, which comprises a plurality of light-sensitive sensor pixels.

FIG. 3 illustrates that the second scintillator pixels 33a, 33b and 33c are tilted relative to the layer formed by the first scintillator structure. The second scintillator pixels are tilted to increase the gaps between the second scintillator pixels 33a, 33b and 33c and the first scintillator pixels 34a, 34b and 34c, respectively. The gaps between these scintillator pixels are filled with the material of the coating 36, which results in an improved optical separation of the second scintillator pixels 33a, 33b and 33c from the first scintillator pixels 34a, 34b and 34c, respectively. The tilt of, for example, the second scintillator pixel 33a therefore ensures that the light emitted by the scintillator material of this pixel does not propagate to the first scintillator pixel 34a. The optical coupling of each of the second scintillator pixels to exactly one first scintillator pixel provides a high spatial resolution capability, but it may also lead to a biased image distortions.

Figure 4:
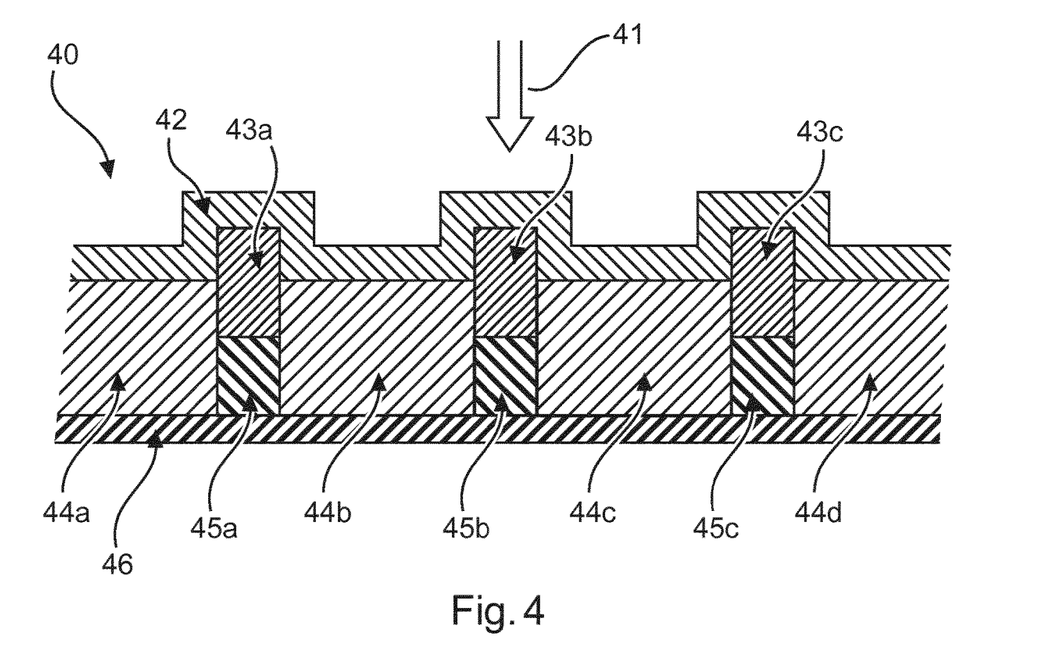
FIG. 4 shows schematically and exemplarily another embodiment of a radiation detector according to the present invention.

FIG. 4 shows schematically and exemplarily another embodiment of a radiation detector 40 according to the invention. More specifically, FIG. 4 shows a section of a radiation detector comprising a small number of scintillator pixels. The skilled person understands that radiation detectors with large numbers of scintillator pixels may be obtained by continuing the structure depicted in FIG. 4.

The radiation detector 40 has a number of similarities to the radiation detector 10 depicted in FIG. 1. In particular, the radiation detector 40 comprises a read-out sensor array 46, a first scintillator structure, a second scintillator structure and a coating 42. The first scintillator structure of the radiation detector 40 comprises a plurality of first scintillator pixels 44a, 44b, 44c and 44d, which are separated by gaps 45a, 45b and 45c. The first scintillator pixels 44a, 44b, 44c and 44d may comprise ceramic scintillator material or particle-in-binder scintillator material. The gaps 45a, 45b and 45c between the first scintillator pixels may be filled at least partially with a reflective material so that light cannot propagate between first scintillator pixels.

The second scintillator structure of the radiation detector 40 comprises second scintillator pixels 43a, 43b and 43c. The second scintillator pixels 43a, 43b and 43c are optically coupled to the first scintillator pixels, so that light can propagate between first and second scintillator pixels. The second scintillator pixels 43a, 43b and 43c overlap the gaps 45a, 45b and 45c between first scintillator pixels, respectively. Thus, the second scintillator pixels 43a, 43b and 43c result in an increased scintillator fill factor.

Also shown is the direction 41 from where radiation impinges on the radiation detector 40. The radiation first propagates through the coating 42. Then, the radiation may be converted to light in the first scintillator pixels or the second scintillator pixels. The light emitted by the scintillator pixels may be detected by the read-out sensor array 46, which comprises a plurality of light-sensitive sensor pixels.

Each of the second scintillator pixels 43a, 43b and 43c is optically coupled to the two adjacent first scintillator pixels. For example, the second scintillator pixel 43a is optically coupled to the first scintillator pixels 44a and 44b. Similarly, the second scintillator pixel 43b is optically coupled to the first scintillator pixels 44b and 44c. Moreover, the second scintillator pixel 43c is optically coupled to the first scintillator pixels 44c and 44d. Optically coupling the second scintillator pixels to the adjacent first scintillator pixels may facilitate a simplified manufacturing of the radiation detector. Furthermore, optically coupling each of the second scintillator pixels to the adjacent first scintillator pixels may provide unbiased image distortions if light is fed from each of the second scintillator pixels into the first scintillator pixels adjacent to the second scintillator pixel with equal probabilities. At the same time, optically coupling the second scintillator pixels to the adjacent first scintillator pixels may result in a reduced spatial resolution capability as compared to optically coupling each of the second scintillator pixels to exactly one of the adjacent first scintillator pixels.

Figure 5:
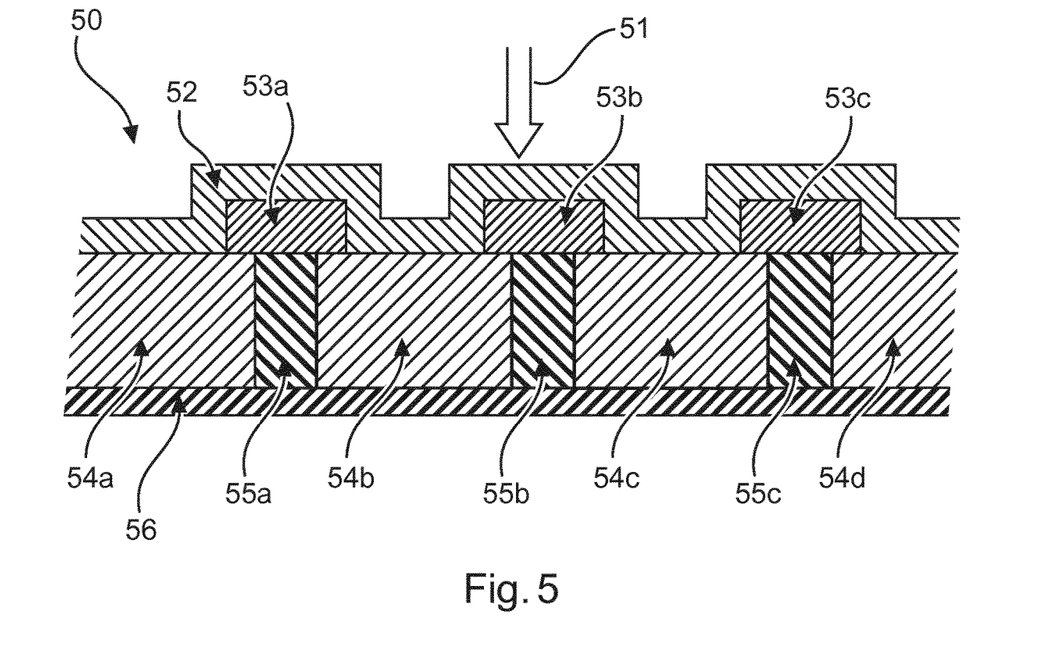
FIG. 5 shows schematically and exemplarily another embodiment of a radiation detector according to the present invention.

FIG. 5 shows schematically and exemplarily another embodiment of a radiation detector 50 according to the invention. More specifically, FIG. 5 shows a section of a radiation detector comprising a small number of scintillator pixels. The skilled person understands that radiation detectors with large numbers of scintillator pixels may be obtained by continuing the structure depicted in FIG. 5.

The radiation detector 50 has a number of similarities to the radiation detector 10 depicted in FIG. 1. In particular, the radiation detector 50 comprises a read-out sensor array 56, a first scintillator structure, a second scintillator structure and a coating 52. The first scintillator structure of the radiation detector 50 comprises a plurality of first scintillator pixels 54a, 54b, 54c and 54d, which are separated by gaps 55a, 55b and 55c. The first scintillator pixels 54a, 54b, 54c and 54d may comprise ceramic scintillator material or particle-in-binder scintillator material. The gaps 55a, 55b and 55c between the first scintillator pixels may be filled at least partially with a reflective material so that light cannot propagate between first scintillator pixels.

The second scintillator structure of the radiation detector 50 comprises second scintillator pixels 53a, 53b and 53c. Each of the second scintillator pixels 53a, 53b and 53c is optically coupled to two first scintillator pixels, so that light can propagate between first and second scintillator pixels. For example, the second scintillator pixel 53a is optically coupled to the first scintillator pixels 54a and 54b. Similarly, the second scintillator pixel 53b is optically coupled to the first scintillator pixels 54b and 54c. Moreover, the second scintillator pixel 53c is optically coupled to the first scintillator pixels 54c and 54d. Optically coupling the second scintillator pixels to the adjacent first scintillator pixels may facilitate a simplified manufacturing of the radiation detector. Furthermore, optically coupling each of the second scintillator pixels to the adjacent first scintillator pixels may provide unbiased image distortions if light is fed from each of the second scintillator pixels into the first scintillator pixels adjacent to the second scintillator pixel with equal probabilities.

The second scintillator pixels 53a, 53b and 53c overlap the gaps 55a, 55b and 55c between first scintillator pixels, respectively. Thus, the second scintillator pixels 53a, 53b and 53c result in an increased scintillator fill factor.

Also shown is the direction 51 from where radiation impinges on the radiation detector 50. The radiation first propagates through the coating 52. Then, the radiation may be converted to light in the first scintillator pixels or the second scintillator pixels. The light emitted by the scintillator pixels may be detected by the read-out sensor array 56, which comprises a plurality of light-sensitive sensor pixels.

The second scintillator pixels 53a, 53b and 53c of FIG. 5 do not extend into the gaps 55a, 55b and 55c between first scintillator pixels, whereas the second scintillator pixels 43a, 43b and 43c of FIG. 4 extend into the gaps between the first scintillator pixels 44a, 44b, 44c and 44d. Each of the second scintillator pixels 53a, 53b and 53c overlaps two first scintillator pixels so that light can propagate from second scintiallator pixels to first scintillator pixels. The arrangement of the first and second scintillator pixels in FIG. 5 prevents that light can propagate in a layer parallel to the read-out sensor array. For this reason, the embodiment illustrated by FIG. 5 may provide a radiation detector with an improved resolution capability as compared to the embodiment illustrated by FIG. 4.

Figure 6:
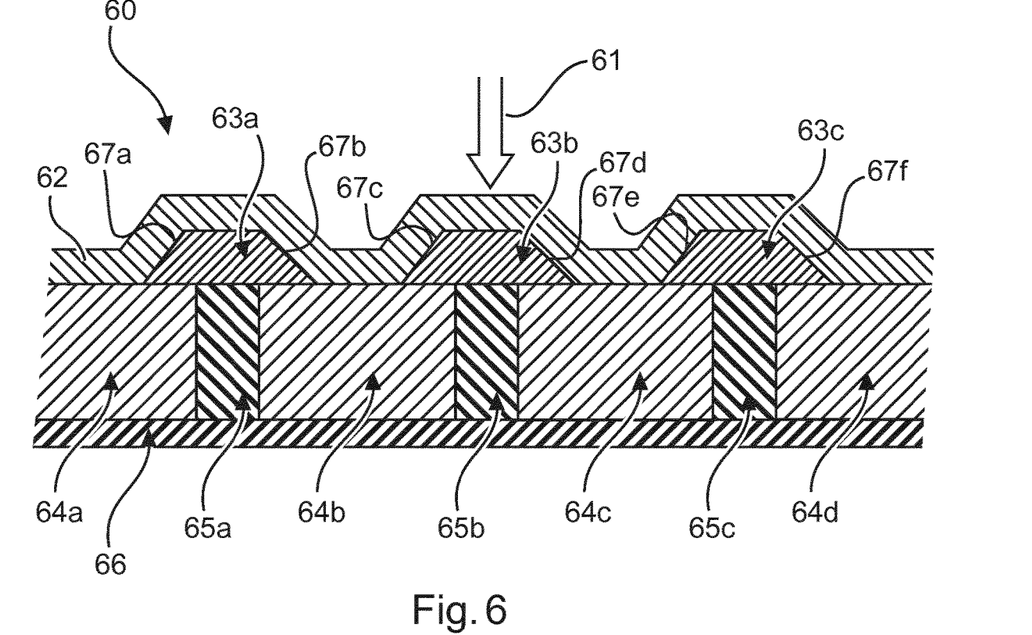
FIG. 6 shows schematically and exemplarily another embodiment of a radiation detector according to the present invention.

FIG. 6 shows schematically and exemplarily another embodiment of a radiation detector 60 according to the invention. More specifically, FIG. 6 shows a section of a radiation detector comprising a small number of scintillator pixels. The skilled person understands that radiation detectors with large numbers of scintillator pixels may be obtained by continuing the structure depicted in FIG. 6.

The radiation detector 60 has a number of similarities to the radiation detector 10 depicted in FIG. 1. In particular, radiation detector 60 comprises a read-out sensor array 66, a first scintillator structure, a second scintillator structure and a coating 62. The first scintillator structure of the radiation detector 60 comprises a plurality of first scintillator pixels 64a, 64b, 64c and 64d, which are separated by gaps 65a, 65b and 65c. The first scintillator pixels 64a, 64b, 64c and 64d may comprise ceramic scintillator material or particle-in-binder scintillator material. The gaps 65a, 65b and 65c between the first scintillator pixels may be filled at least partially with a reflective material so that light cannot propagate between first scintillator pixels.

The second scintillator structure of the radiation detector 60 comprises second scintillator pixels 63a, 63b and 63c. Each of the second scintillator pixels 63a, 63b and 63c overlaps two first scintillator pixels, so that light can propagate between first and second scintillator pixels. For example, the second scintillator pixel 63a is optically coupled to the first scintillator pixels 64a and 64b. Similarly, the second scintillator pixel 63b is optically coupled to the first scintillator pixels 64b and 64c. Moreover, the second scintillator pixel 63c is optically coupled to the first scintillator pixels 64c and 64d. Optically coupling the second scintillator pixels to the adjacent first scintillator pixels may facilitate a simplified manufacturing of the radiation detector. Furthermore, optically coupling each of the second scintillator pixels to the adjacent first scintillator pixels may provide unbiased image distortions if light is fed from each of the second scintillator pixels into the first scintillator pixels adjacent to the second scintillator pixel with equal probabilities.

The second scintillator pixels 63a, 63b and 63c overlap the gaps 65a, 65b and 65c between first scintillator pixels, respectively. Thus, the second scintillator pixels 63a, 63b and 63c result in an increased scintillator fill factor.

The second scintillator pixels 63a, 63b and 63c of FIG. 6 do not extend into the gaps 65a, 65b and 65c between first scintillator pixels. The arrangement of the first and second scintillator pixels in FIG. 6 prevents that light can propagate in a layer parallel to the read-out sensor array, which may result in a radiation detector with a good resolution capability.

Also shown is the direction 61 from where radiation impinges on the radiation detector 60. The radiation first propagates through the coating 62. Then, the radiation may be converted to light in the first scintillator pixels or the second scintillator pixels. The light emitted by the scintillator pixels may be detected by the read-out sensor array 66, which comprises a plurality of light-sensitive sensor pixels.

Figure 7:
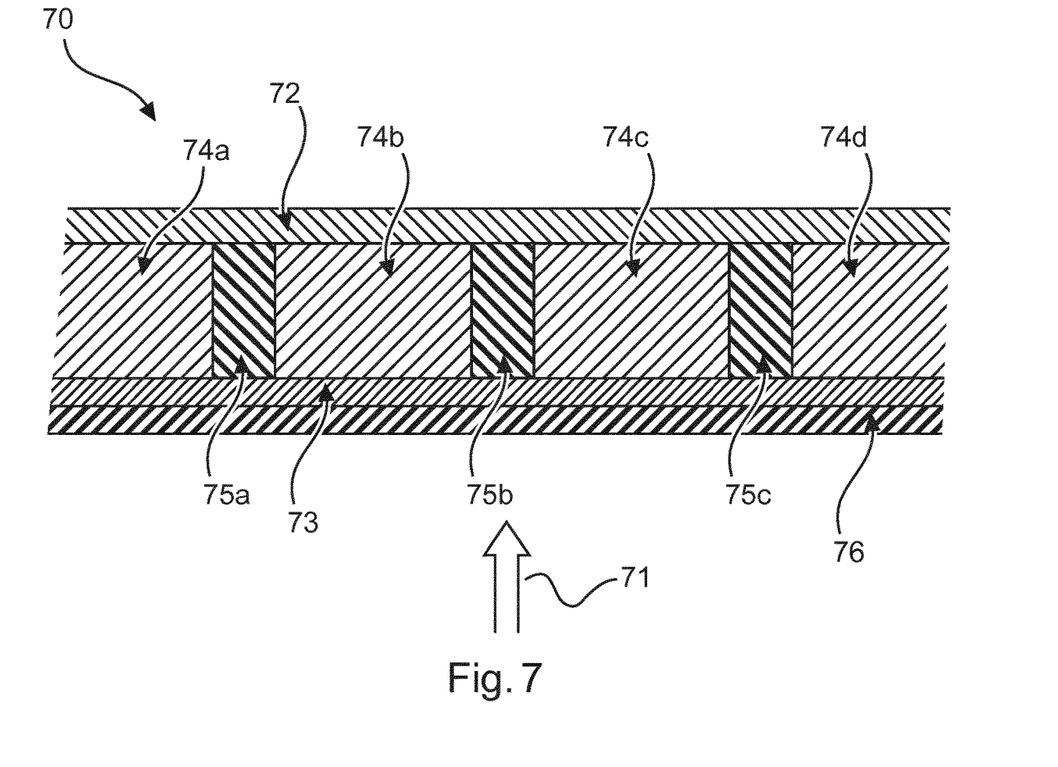
FIG. 7 shows another example of a radiation detector with high scintillator fill factor.

The surfaces of the second scintillator pixels 63a, 63b and 63c comprise slanted surface sections 67a to 67f, which are inclined relative to the layer formed by the first scintillator structure to reflect light from inside the second scintillator pixels towards optically coupled first scintillator pixels. For example, the slanted surface section 67c is configured to guide light emitted by the second scintillator pixel 63b towards the optically coupled first scintillator pixel 64b. In the embodiment illustrated by FIG. 6, the slanted surface section 67a to 67f are planar, and the slanted surface sections touch the surfaces of the first scintillator pixels 64a to 64d. The angles between the slanted surface sections 67a to 67f and the surfaces of the optically coupled first scintillator pixels 64a to 64d, when seen from inside the second scintillator pixels, is less than 90° and may typically lie in a range from 30° to 60°. FIG. 7 shows schematically another example radiation detector with high fill factor. More specifically, FIG. 7 shows a section of a radiation detector comprising a small number of scintillator pixels. The skilled person understands that radiation detectors with large numbers of scintillator pixels may be obtained by continuing the structure depicted in FIG. 7.

The radiation detector 70 comprises a read-out sensor array 76, a first scintillator structure, a second scintillator structure 73 and a coating 72. The first scintillator structure of the radiation detector 70 comprises a plurality of first scintillator pixels 74a, 74b, 74c and 74d, which are separated by gaps 75a, 75b and 75c. The first scintillator pixels 74a, 74b, 74c and 74d may comprise ceramic scintillator material or particle-in-binder scintillator material. The gaps 75a, 75b and 75c between the first scintillator pixels may be filled at least partially with a reflective material so that light cannot propagate between first scintillator pixels.

The second scintillator structure 73 of the radiation detector 70 is a non-pixelated slab scintillator. The second scintillator structure 73 is optically coupled to the first scintillator pixels, so that light can propagate between the first scintillator pixels and the second scintillator structure 73. The second scintillator structure 73 overlaps the gaps 75a, 75b and 75c between the first scintillator pixels. Thus, the second scintillator structure 73 results in an increased scintillator fill factor.

FIG. 7 shows that the read-out sensor array, the second scintillator structure, the first scintillator structure and the coating are arranged in this order. Also shown is the direction 71 from where radiation impinges on the radiation detector 70. The radiation first propagates through the read-out sensor array 76. Then, the radiation may be converted to light in the first scintillator pixels or the second scintillator structure. The emitted light may be detected by the read-out sensor array 76, which comprises a plurality of light-sensitive sensor pixels. In an imaging system comprising a radiation source and a radiation detector according to FIG. 7, the read-out sensor array is preferably directed away from the radiation source.

A non-pixelated second scintillator structure may be easy to manufacture. At the same time, a non-pixelated second scintillator structure may result in a reduced spatial resolution capability, since light may propagate through the whole non-pixelated second scintillator structure.

It has to be noted that embodiments of the invention are described with reference to different subject matters. In particular, some embodiments are described with reference to method type claims whereas other embodiments are described with reference to the device type claims. However, a person skilled in the art will gather that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or steps, and the indefinite article "a" or "an" does not exclude a plurality. A single processor or other unit may fulfil the functions of several items re-cited in the claims. The mere fact that certain measures are re-cited in mutually different dependent claims does not indicate that a combination of these measures cannot be used to advantage. Any reference signs in the claims should not be construed as limiting the scope.

The invention claimed is:

1. A radiation detector, comprising:
a read-out sensor array, a first scintillator structure, a second scintillator structure and a coating,
wherein the read-out sensor array comprises a plurality of light-sensitive sensor pixels;
wherein the first scintillator structure comprises a plurality of first scintillator pixels separated by gaps;
wherein the second scintillator structure is optically coupled to the first scintillator structure;
wherein the first scintillator structure and the second scintillator structure are arranged between the coating and the read-out sensor array;
wherein the second scintillator structure at least partially overlaps the gaps between the first scintillator pixels of the first scintillator structure;
wherein the second scintillator structure comprises a plurality of second scintillator pixels separated by gaps;
wherein at least one second scintillator pixel at least partially overlaps a gap between the first scintillator pixels;
wherein the at least one second scintillator pixel comprises at least one slanted surface section formed by a particle-in-binder scintillator material; and
wherein the at least one slanted surface section that is formed by the particle-in-binder scintillator material is inclined relative to a layer formed by the scintillator structure.

2. The radiation detector according to claim 1,
wherein the at least one second scintillator pixel is optically coupled to exactly one first scintillator pixel.

3. The radiation detector according to claim 1,
wherein the at least one second scintillator pixel is optically coupled to exactly two first scintillator pixels.

4. The radiation detector according to claim 3,
wherein the at least one second scintillator pixel does not extend into the gap between the exactly two first scintillator pixels, which are optically coupled to the at least one second scintillator pixel.

5. The radiation detector according to claim 1,
wherein one slanted surface section of the at least one slanted surface section reflects light from inside the at least one second scintillator pixel towards a first scintillator pixel, which is optically coupled to the at least one second scintillator pixel.

6. The radiation detector according to claim 1,
wherein the at least one second scintillator pixel is tilted relative to the layer formed by the first scintillator structure to increase another gap between the at least one second scintillator pixel and a first scintillator pixel, which is not optically coupled to the at least one second scintillator pixel, and
wherein the other gap between the at least one scintillator pixel and the first scintillator pixel is formed at least by one slanted surface section of the at least one slanted surface section and by the first scintillator pixel.

7. The radiation detector according to claim 1,
wherein the first scintillator structure comprises ceramic scintillator material.

8. The radiation detector according to claim 1,
wherein the coating is a light-reflective layer.

9. The radiation detector according to claim 1, further comprising a substrate made of thin flexible polymer foil or glass.

10. The radiation detector according to claim 1, wherein the radiation detector has a non-planar shape.

11. An imaging system, comprising:
a radiation source; and
a radiation detector comprising a read-out sensor array, a first scintillator structure, a second scintillator structure and a coating,
    wherein the read-out sensor array comprises a plurality of light-sensitive sensor pixels;
    wherein the first scintillator structure comprises a plurality of first scintillator pixels separated by gaps;
    wherein the second scintillator structure is optically coupled to the first scintillator structure;
    wherein the first scintillator structure and the second scintillator structure are arranged between the coating and the read-out sensor array;
wherein the second scintillator structure at least partially overlaps the gaps between the first scintillator pixels of the first scintillator structure;
    wherein the second scintillator structure comprises a plurality of second scintillator pixels separated by gaps;
    wherein at least one second scintillator pixel at least partially overlaps a gap between the first scintillator pixel;
    wherein the at least one second scinitillator pixel comprises at least on slanted surface section formed a particle-in-bind scintillator material; and
    wherein the at least one slanted surface section that is formed by the particle-in-binder scintillator material is inclined relative to a layer formed by the first scintillator structure.

12. The imaging system according to claim 11,
wherein the read-out sensor array of the radiation detector is directed towards the radiation source.

13. A method for manufacturing a radiation detector, the method comprising:
assembling a read-out sensor array, a first scintillator structure, a second scintillator structure and a coating,
wherein the read-out sensor array comprises a plurality of light-sensitive sensor pixels;
wherein the first scintillator structure comprises a plurality of first scintillator pixels separated by gaps;
wherein the second scintillator structure is optically coupled to the first scintillator structure;
wherein the first scintillator structure and the second scintillator structure are arranged between the coating and the read-out sensor array; and
wherein the second scintillator structure at least partially overlaps the gaps between the first scintillator pixels of the first scintillator structure;
wherein the second scintillator structure comprises a plurality of second scintillator pixels separated by gaps;
wherein at least one second scintillator pixel at least partially overlaps a gap between the first scintillator pixels;
wherein the at least one second scintillator pixel comprises at least one slanted surface section formed by a particle-in-binder scintillator material; and
wherein the at least one slanted surface section that is formed by the article-in-binder scintillator material is inclined relative to a layer formed by the first scintillator structure.

14. The method according to claim 13, further comprising:
mounting the second scintillator structure on the first scintillator structure by additive manufacturing, wherein the second scintillator structure comprises particle-in-binder scintillator material.

15. The radiation detector of claim 1, wherein the plurality of first scintillator pixels includes an incident surface section that faces a side of one slanted surface section of the at least one slanted surface section formed by the particle-in-binder scintillator material, and
wherein the slanted surface section formed by the particle-in-binder scintillator material overlaps the incident surface section as viewed in a direction from the slanted surface section toward the incident surface section.

16. The radiation detector of claim 15, wherein the incident surface section of the plurality of first scintillator pixels directly contacts with the particle-in-binder scintillator material of the at least one second scintillator pixel.

17. The radiation detector of claim 1, further comprising a surface section formed by an optical reflector material inside one of the gaps,
wherein the surface section formed by the optical reflector material and one slanted surface section of the at least one slanted surface section form another gap in which a part of the coating is disposed.

* * * * *